(12) United States Patent
Nefian

(10) Patent No.: US 7,203,368 B2
(45) Date of Patent: Apr. 10, 2007

(54) EMBEDDED BAYESIAN NETWORK FOR PATTERN RECOGNITION

(75) Inventor: Ara V. Nefian, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 10/269,381

(22) Filed: Jan. 6, 2003

(65) Prior Publication Data

US 2004/0131259 A1    Jul. 8, 2004

(51) Int. Cl.
G06K 9/62 (2006.01)
G06K 9/00 (2006.01)
G10L 15/00 (2006.01)
G05B 13/02 (2006.01)

(52) U.S. Cl. .............. 382/228; 382/159; 382/118; 700/47; 704/256.1

(58) Field of Classification Search ............ 382/228, 382/159; 700/47; 704/256.1
See application file for complete search history.

(56) References Cited

U.S. PATENT DOCUMENTS

| | | | |
|---|---|---|---|
| 5,454,043 A | 9/1995 | Freeman | |
| 5,596,362 A | 1/1997 | Zhou | |
| 5,710,590 A | 1/1998 | Ichige et al. | |
| 5,754,695 A | 5/1998 | Kuo et al. | |
| 5,850,470 A | 12/1998 | Kung et al. | |
| 5,887,069 A | 3/1999 | Sakou et al. | |
| 6,024,852 A | 2/2000 | Tamura et al. | |
| 6,072,494 A | 6/2000 | Nguyen | |
| 6,075,895 A | 6/2000 | Qiao et al. | |
| 6,108,005 A | 8/2000 | Starks et al. | |
| 6,128,003 A | 10/2000 | Smith et al. | |
| 6,184,926 B1 | 2/2001 | Khosravi et al. | |
| 6,185,529 B1 | 2/2001 | Chen et al. | |
| 6,191,773 B1 | 2/2001 | Maruno et al. | |
| 6,212,510 B1 | 4/2001 | Brand | |
| 6,215,890 B1 | 4/2001 | Matsuo et al. | |
| 6,219,639 B1 | 4/2001 | Bakis et al. | |
| 6,222,465 B1 | 4/2001 | Kumar et al. | |
| 6,304,674 B1 | 10/2001 | Cass et al. | |

(Continued)

FOREIGN PATENT DOCUMENTS

RU    2112273 C1    8/1995

(Continued)

OTHER PUBLICATIONS

Matthew Brand, "Coupled Hidden Markov Models for Modeling Interacting Processes," Learning and Common Sense Technical Report 405, Jun. 3, 1997, pp. 1-28, MIT Media Lab Perceptual Computing, USA.

(Continued)

*Primary Examiner*—Joseph Mancuso
*Assistant Examiner*—Kathleen Yuan
(74) *Attorney, Agent, or Firm*—Guojun Zhou

(57) ABSTRACT

A pattern recognition procedure forms a hierarchical statistical model using a hidden Markov model and a coupled hidden Markov model. The hierarchical statistical model supports a pa 20 layer having multiple supernodes and a child layer having multiple nodes associated with each supernode of the parent layer. After training, the hierarchical statistical model uses observation vectors extracted from a data set to find a substantially optimal state sequence segmentation.

18 Claims, 4 Drawing Sheets

U.S. PATENT DOCUMENTS

| | | |
|---|---|---|
| 6,335,977 B1 | 1/2002 | Kage |
| 6,385,331 B2 | 5/2002 | Harakawa et al. |
| 6,594,629 B1 | 7/2003 | Basu et al. |
| 6,609,093 B1 | 8/2003 | Gopinath et al. |
| 6,624,833 B1 | 9/2003 | Kumar et al. |
| 6,633,844 B1 | 10/2003 | Verma et al. |
| 6,678,415 B1 | 1/2004 | Popat et al. |
| 6,751,354 B2 | 6/2004 | Foote et al. |
| 6,816,836 B2 | 11/2004 | Basu et al. |
| 6,952,687 B2 * | 10/2005 | Andersen et al. ............. 706/12 |
| 2002/0036617 A1 | 3/2002 | Pryor |
| 2002/0093666 A1 | 7/2002 | Foote et al. |
| 2002/0102010 A1 | 8/2002 | Liu et al. |
| 2002/0135618 A1 | 9/2002 | Maes et al. |
| 2002/0140718 A1 | 10/2002 | Yan et al. |
| 2002/0161582 A1 | 10/2002 | Basson et al. |
| 2003/0123754 A1 | 7/2003 | Toyama |
| 2003/0144844 A1 | 7/2003 | Colmenarez et al. |
| 2003/0154084 A1 | 8/2003 | Li et al. |
| 2003/0171932 A1 | 9/2003 | Juang et al. |
| 2003/0190076 A1 | 10/2003 | DeLean |

FOREIGN PATENT DOCUMENTS

| | | |
|---|---|---|
| RU | 2093890 C1 | 10/1997 |
| WO | WO 00/36845 | 6/2000 |
| WO | WO 03/009218 A1 | 1/2003 |

OTHER PUBLICATIONS

A. Nefian and M. Hayes III, "An Embedded HMM-Based Approach for Face Detection and Recognition," Proceedings of the IEEE International Conference on Acoustics, Speech, and Signal Processing: Mar. 15-19, 1999, IEEE, pp. 3553-3556, USA.

A. Nefian et al., "A Coupled HMM for Audio-Visual Speech Recognition," 2002 IEEE International Conference on Acoustics, Speech, and Signal Processing, IEEE, vol. 3 of 4, May 13, 2002, pp. 2013-2016, USA.

Ara V. Nefian, "Embedded Bayesian Networks for Face Recognition," IEEE International Conference on Multimedia and Expo, IEEE, vol. 2, Aug. 26, 2002, pp. 133-136, USA.

Hennecke, et al: Automatic Speech Recognition System Using Acoustic and Visual Signals, IEEE, 1996.

Dupont et al: Audio-Visual Speech Modeling for Continuous Speech Recognition, Sep. 2000, IEEE Transactions on Multimedia, vol. 2, No. 3, pp. 141-151.

Potamianos et al: An Image Transform Approach for HMM Based Automatic Lipreading, Proc. Int. conf. Image Processing, 1998.

Potamianos et al: Linear Discriminant Analysis for Speechreading; IEEE Workshop on Multimedia Processing, Dec. 1998.

Chan: HHH-Based Audio-Visual Speech Recognition Integrating Geometric and Appearance-Based Visual Features, IEEE 2001.

Pavlovic: Dynamic Bayesian Networks for Information Fusion with Applications to Human-Computer Interfaces; Thesis, University of Urbana-Champaign, 1999, pp. iii-ix and 63-81.

Rezek, et al: Coupled Hidden Markov Models for Biosignal Interaction; Advances in Medical Signal and Information Processing, Sep. 4-6, 2000; pp. 54-59.

Fu, et al: Audio-Visual Speaker Identification Using Coupled Hidden Markov Models; 2003 Int'l Conference on Image Processing (ICIP), Sep. 14-17, 2003; vol. 2, pp. 29-32.

Kristjansson, et al: Event-Coupled Hidden Markov Models; 2000 IEEE Int'l Conference on Multimedia and Expo, Jul. 30-Aug. 2, 2000; vol. 1; pp. 385-388.

Pavlovic: Multimodal Tracking and Classification of Audio-Visual Features; 1998 Int'l Conference on Image Processing, ICIP Proceedings; Oct. 4-7, 1998, vol. 1; pp. 343-347.

Wikipedia, definition of Hidden Markov Model, 3 pages.

Wikipedia, definition of Viterbi Algorithm, 5 pages.

Rezek, et al: Learning Interaction Dynamics with Coupled Hidden Markov Models; IEEE Proceedings—Science, Measurement and Technology, Nov. 2000; vol. 147, Issue 6; pp. 345-350.

Logan et al: Factorial Hidden Markov Models for Speech Recognition: Preliminary Experiments; Cambridge Research Laboratory; Technical report Series; CRL 97/7; Sep. 1997.

Dugad: Tutorial on Hidden Markov Models; Technical Report No.: SPANN-96, May 1996, pp. 1-16.

Kennedy, et al: Identification of Coupled Markov Chain Model with Application; Proceedings of the 31st IEEE Conference on Decision and Control, Dec. 16-18, 1992; vol. 4, pp. 3529-3534.

Ramesh, et al: Automatic Selection of Tuning Parameters for Feature Extraction Sequences; Proceedings IEEE Computer Society Conference on Computer vision and Pattern Recognition; Jun. 21-23, 1994, pp. 672-677.

Liang, et al: Speaker Independent Audio-Visual Continuous Speech Recognition; Aug. 2002; Multimedia and Expo, vol. 2, pp. 25-28; IEEE.

Luettin et al.: Asynchronous Stream Modelling for Large Vocabulary Audio-Visual Speech Recognition, Proceedings of the 2001 IEEE Int'l Conference of Acoustics, Speech and Signal Processing (ICASSP'01), May 7-11, 2001, pp. 169-172.

Gordan: A Temporal Network for Support Vector Machine Classifiers for the Recognition of Visual Speech, Methods and Applications of Artificial Intelligence: Proceedings of the 2nd hellenic Conference on AI (SETN 2002), Thessaloniki, Greece, Apr. 11-12, 2002, pp. 355-365.

Ming-Husan Yang et al.: Detecting Faces in Images: A Survey; IEEE trans Pattern Analysis and Machine Intelligence, vol. 24, No. 1, Jan. 2002, pp. 34-58.

Yongmin Li et al.: Multi-view Face Detection Using Support Vector Machines and Eigenspace Modelling, Proceedings on the Int'l Conference on Knowledge-based Intelligent Engineering Systems and.

Batra: Modeling and Efficient Optimization for Object-Based Scalability and Some Related Problems, IEEE Transactions onImage processing, vol. 9, No. 10, Oct. 10, 2000, pp. 1677-1692.

Pending U.S. Appl. No. 10/326,368; Office Action dated Jul. 25, 2006.

Int'l Application No.: PCT/US03/31454 Written Opinion dated Oct. 12, 2006.

Brand: Coupled Hidden Markov Models for Modeling Interacting Processes; MIT Media Lab Perceptual Computing/Learning and Common Sense Technical Report 405; Nov. 3, 1996, revised Jun. 3, 1997; XP-002253550; 28 pages.

NETI et al.: Large-Vocabulary Audio-Visual Speech Recognition: A Summary of the Johns Hopkins Summer 2000 Workshop.

Pending U.S. Appl. No. 10/143,459, filed May 9, 2002, inventor: Lu Hong Liang; Final Office Action dated Oct. 31, 2006.

Wikipedia: Definition of Linear Discriminant Analysis.

Pending U.S. Appl. No.: 10/143,459 filed May 9, 2002, inventor: Lu Hong Liang; Final Office Action dated Oct. 31, 2006.

* cited by examiner

EMBEDDED BAYESIAN NETWORK FOR PATTERN RECOGNITION

FIELD OF THE INVENTION

The present invention relates to computer mediated pattern detection. More particularly, the present invention relates to improved Bayesian networks for classifying data.

BACKGROUND

Bayesian networks such as those represented by the hidden Markov model (HMM) and coupled Hidden Markov (CHMM) models have long been used to model data for the purposes of pattern recognition. Any discrete time and space dynamical system governed by such a Bayesian network emits a sequence of observable outputs with one output (observation) for each state in a trajectory of such states. From the observable sequence of outputs, the most likely dynamical system can be calculated. The result is a model for the underlying process. Alternatively, given a sequence of outputs, the most likely sequence of states can be determined.

For example, one dimensional HMMs have been widely used in speech recognition to model phonemes, words, or even phrases, and two dimensional HMMs have been used for image processing tasks. One of the important characteristics of a HMM is its ability to cope with variations in feature space, allowing data modeling with variations along different dimensions. Coupled hidden Markov models can be similarly employed, since they correspond to a generalization of a HMM. A CHMM may comprise a collection of HMMs, each of which corresponds to a data channel.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
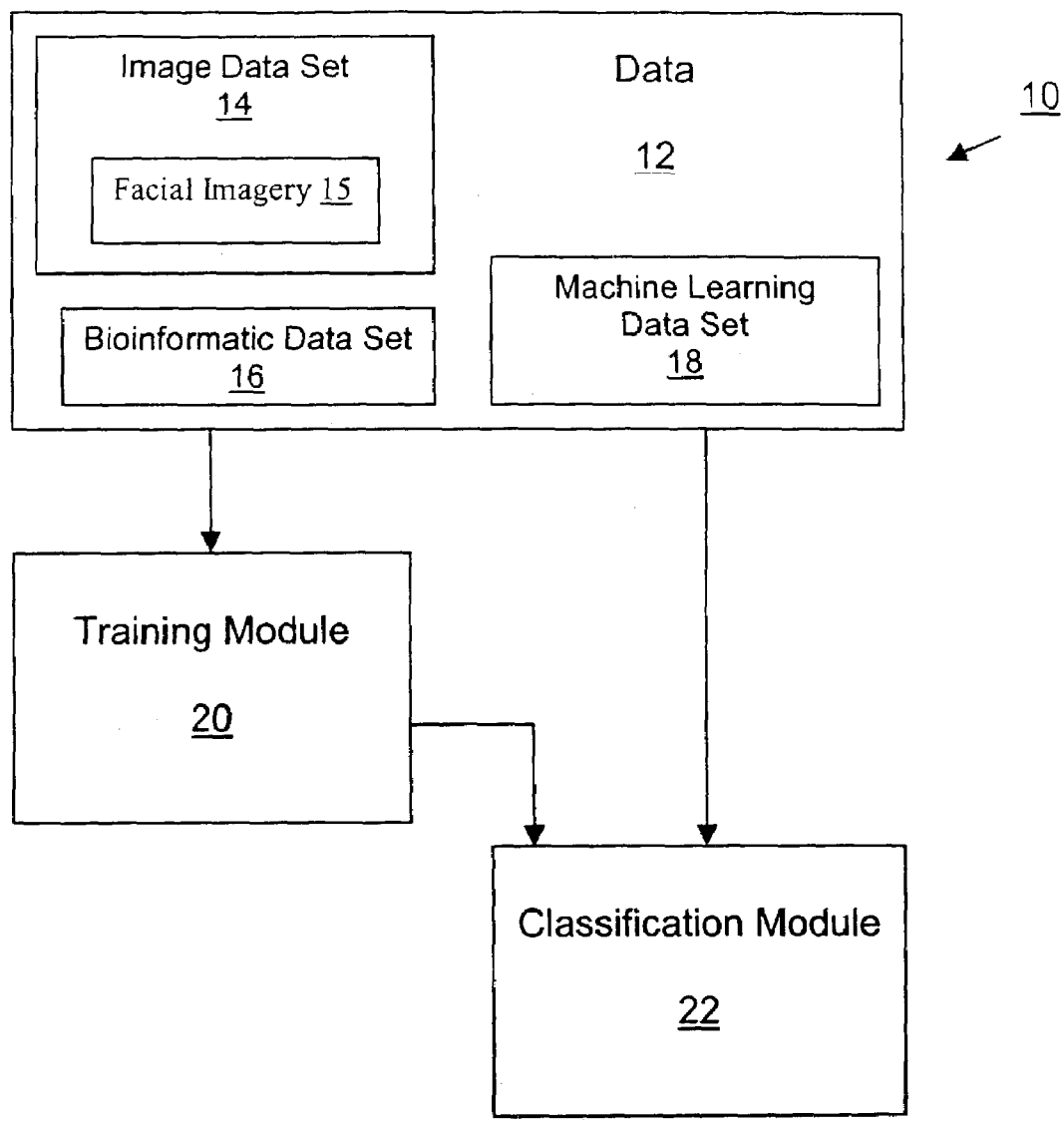
FIG. 1 schematically illustrates a data classification system.

FIG. 1 generally illustrates a system 10 for data analysis of a data set 12 using an embedded Bayesian network that includes a hidden Markov model (HMM) and a coupled hidden Markov model (CHMM). A embedded Bayesian network is used because it has good generalization performance even for high dimensional input data and small training sets.

The data set 12 can include static or video imagery 14 containing objects to be identified or classified, including but not limited to textual characters, ideographs, symbols, fingerprints, or even facial imagery 15. In addition, non-image data sets such as bioinformatic databases 16 containing, for example, gene or protein sequences, DNA microarray data, sequence data, phylogenetic information, promoter region information; or textual, linguistic, or speech analysis data suitable for machine learning/identification 18 can be used. The same data set can be optionally used both to train and classify data with the appropriate training module 20 and classification module 22.

The processing procedure for system 10 maybe performed by a properly programmed general-purpose computer alone or in connection with a special purpose computer. Such processing may be performed by a single platform or by a distributed processing platform. In addition, such processing and functionality can be implemented in the form of special purpose hardware, custom application specific integrated circuits (ASICs), configurable FPGA circuits, or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 2:
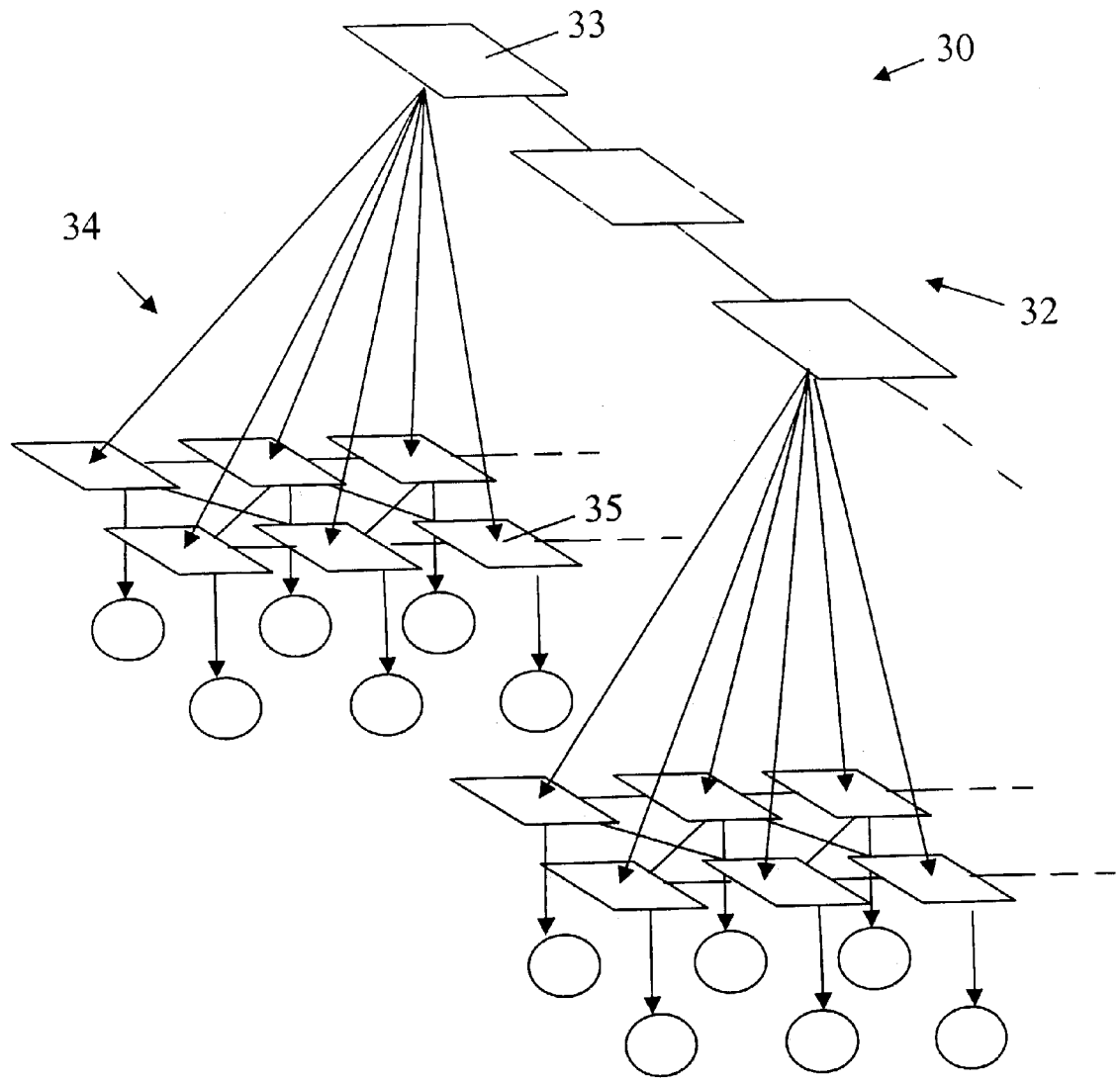
FIG. 2 generically illustrates an embedded hidden Markov model-coupled hidden Markov model (HMM-CHMM) structure.

FIG. 2 generically illustrates a logical structure 30 of an embedded hidden Markov model-coupled hidden Markov model (HMM-CHMM). As seen in FIG. 2, HMM-CHMM is a hierarchical statistical model that includes a HMM parent layer 32 (collectively formed from nodes 33) and a CHMM child layer 34 (collectively formed from nodes 35). The child layer 34 associates one CHMM node 35 to each node 33 in the parent layer 32, and the parameters of the individual CHMMs remain independent from each other. Instead, the parameters of each child layer CHMM depend upon the state of the connected parent node 33. Typically, for multidimensional data sets, the HMM in the parent layer 32 is associated with at least one dimension, and the CHMM child layers are associated with data in an orthogonal dimension with respect to the parent layer.

Formally defined, the elements of an embedded HMM-CHMM have: an initial super state probability $\pi_{0,0}$ and a super state transition probability from super state j to super state i, $a_{0,i|j}$, where super state refers to the state of the parent layer 32 HMM node 33.

For each super state k the parameters of the corresponding CHMM are defined to have an initial state probability in a channel of $$c=1, \ldots, C_1, \pi_{1,0}^{k,c};$$

a state transition probability from state sequence j to state:

$$_{i_c}a_{1,i_c|j}^{k,c}$$

and an observation probability:

$$b_{t_0,t_1}^{k,c}(j_c).$$

In a continuous mixture with Gaussian components, the probability of the observation vector O is given by:

$$b^{k,c}(j_c) = \sum_{m=1}^{M_j^{k,c}} \omega_{j,m}^{k,c} N(O, \mu_{j,m}^{k,c}, U_{j,m}^{k,c})$$

where $\mu_{j,m}^{k,c}$ and $U_{j,m}^{k,c}$ are the mean and covariance matrix of the mth mixture of the Gaussian mixture corresponding to the jth state in the cth channel, $M_j^{k,c}$ is the number of mixtures corresponding to the jth state of the cth channel, and $\omega_{j,m}^{k,c}$ is a weight associated with the corresponding mixture.

Observation sequences are used to form observation vectors later used in training and classifying. For example, the observation sequence for a two-dimensional image maybe formed from image blocks of size $L_x \times L_y$ that are extracted by scanning the image from left-to-right and top-to-bottom. Adjacent image blocks may be designed to have an overlap by $P_y$ rows in the vertical direction and $P_x$ columns in the horizontal direction. In one possible embodiment, with blocks size of $L_y$=8 rows and $L_x$=8 columns, a six DCT coefficients (a 3×2 low-frequency array) may be employed to create the overlap.

The resulting array of observation vectors may correspond to size of $T_0 \times T_1$, where $T_0$ and $T_1$ are the number of observation vectors extracted along the height (H) and the width (W) of the image, respectively. $T_0$ and $T_1$ may be computed accordingly as:

$$T_0 = \frac{H - L_y}{L_y - P_y} + 1,$$

$$T_1 = \frac{W - L_x}{L_x - P_x} + 1$$

Consecutive horizontal and vertical observation vectors may also be grouped together to form observation blocks. This may be used as a way to consolidate local observations and at the same time to reduce the total amount of observations. In practice, this data grouping serves application needs and improve recognition efficiency.

To compute the number of observation blocks, denote the number of observation blocks in the vertical and horizontal direction be $T_0^0$ and $T_1^0$, respectively. Then, $$T_0^0 = 1$$

$$T_1^0 = \frac{T_1}{C_1}$$

In addition, denote the number of observation vectors in the horizontal and vertical direction within each observation block by $T_0^1$ and $T_1^1$, respectively, where $$T_0^1 = T_1$$

$$T_1^1 = C_1$$

Furthermore, denote $O_{t_0,t_1,c}$ as the $t_1$th observation vector corresponding to the cth channel within the observation block $t_0$.

Although any suitable state sequence segmentation can be used, a modified Viterbi algorithm for the HMM-CHMM is preferred. Application of this modified Viterbi algorithm determines the optimal state and super state segmentation of the observation sequence. The best super state probability for the observation block $t_0$ given super state i of super channel s, is denoted as $P_{t_0}(i)$. Corresponding optimal state and optimal state sequence $\beta_{t_0,t_1,c}(i)$ may then be computed for each super observation. The following states are first initialized:

$\delta(i) = \pi_{0,0}(i) P_{t_0}(i)$ $\psi_0(i) = 0$

Figure 3:
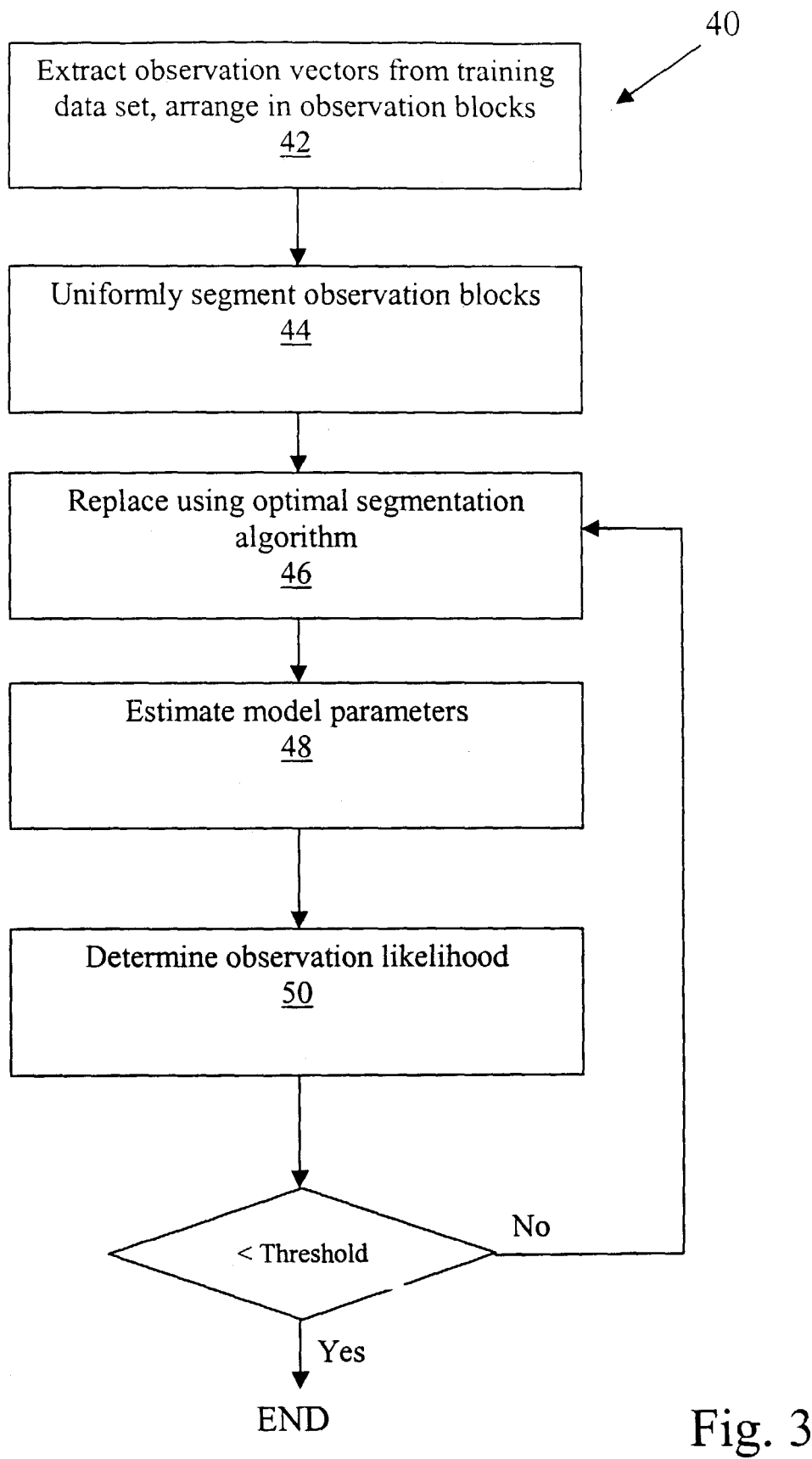
FIG. 3 is a flow diagram illustrating training of an embedded HMM-CHMM.

The following states are then recursively determined:

$\delta_{t_0}(i) = \max_j \{\delta_{t_0-1}(j) a_{0,i|j} P_{t_0}(i)\}$ $\psi_{t_0}(i) = \text{argmax}_j \{\delta_{t_0-1}(j) a_{0,i|j} P_{t_0}(i)\}$ The termination condition is then computed:

$P = \max_i \{\delta_{T_0}(i)\}$ $\alpha_{T_0} = \text{arg max}_i \{\delta_{T_0}(i)\}$ Based on the computed termination condition, a backtracking operation is performed:

$\alpha_{T_0} = \psi_{0,t+1}(\alpha_{T_0+1})$ $q_{t_0,t_1,c}^0 = \alpha_{t_0}$ $q_{t_0,t_1,c}^1 = \beta_{t_0,t_1,c}(\alpha_{t_0})$ FIG. 3 is a flow diagram 40 illustrating training of an embedded HMM-CHMM based on the Viterbi algorithm, according to embodiments of the present invention. To train an HMM-CHMM based on given training data, observation vectors are first extracted from the training data set and organized in observation blocks (module 42). These observation blocks are uniformly segmented (module 44), replaced by an optimal state segmentation algorithm (module 46), have their model parameters estimated (module 48), and observation likelihood determined (module 50). As will be appreciated, the training may be iterative, with each training data set used individually and iteratively to update model parameters until the observation likelihood computed is smaller than a specified threshold.

More specifically, the training data set may be segmented along a first dimension according to the number of super states, into a plurality of uniform segments each of which corresponding to a super state. Based on the uniform segmentation at the super layer, the observation vectors within each uniform segment may then be uniformly segmented according to the number of channels and number of states of each child CHMM.

The density function of each state (including both super states as well as child states) may be initialized before the training takes place. For example, if Gaussian mixture model is adopted for each state, Gaussian parameters for each of the mixture component may need to be initialized. Different approaches may be employed to achieve the initialization of model parameters. For example, one embodiment may be implemented where the observation sequence assigned to each channel c and state j, and super state k and super channel s may be assigned to $M_j^{k,c}$ clusters using, for example, the K-means algorithm.

During the process of training, the original uniform segmentation is updated based on the optimal state segmentation using the Viterbi algorithm or other suitable algorithms. To update the density function of a state, particular relevant parameters to be updated may be determined prior to the update operation.

The selection of a Gaussian mixture component for each state j channel c and super state k is also required. One exemplary criterion to make the selection may correspond to assigning the observation to $O_{t_0,t_1,c}^{(r)}$ from the rth training sample in the training set to the Gaussian component for which the Gaussian density function $$N(O_{t_0,t_1,c}^{(r)}; \mu_{j,m}^{k,c}, U_{j,m}^{k,c})$$

is the highest.

The parameters are then estimated using, for example, an extension of the segmental K-means algorithm. In particular, the estimated transition probability $$a'_{0,i_c|j}$$

between super states $i_s$ and j may be obtained as follows:

$$a'_{0,i|j} = \frac{\sum_r \sum_{t_0} \sum_{t_1} \in_{t_0}^{(r)}(i,j)}{\sum_r \sum_{t_0} \sum_{t_1} \sum_l \in_{t_0}^{(r)}(i,l)}$$

where $\in_{t_0}^{(r)}(i,l)$ may equal to one if a transition from super state l to the super state i occurs for the observation block $(t_0)$ and zero otherwise. The estimated transition probabilities $$a'^{k,c}_{1,i_c|j}$$

from embedded state sequence j to the embedded state $i_c$ in channel c of super state k may then be obtained as follows, $$a'^{k,c}_{1,i_c|j} = \frac{\sum_r \sum_{t_0} \sum_{t_1} \theta_{t_0,t_1}^{(r)}(k, c, i_c, j)}{\sum_r \sum_{t_0} \sum_{t_1} \sum_l \theta_{t_0,t_1}^{(r)}(k, c, i_c, l)}$$

where $\theta_{t_0,t_1}^{(r)}(s, k, c, i_c, l)$ may be one if in the observation block $(t_0)$ from the rth training sample a transition from state sequence j to state $i_c$ in channel c occurs for the observation to $O_{t_0,t_1,c}^{(r)}$ and zero otherwise.

The parameters of the selected Gaussian mixture component may also be accordingly updated. The involved Gaussian parameters may include a mean vector $$\mu'^{k,c}_{j,m,a}$$

covariance matrix $$U'^{k,c}_{j,m}$$

of the Gaussian mixture, and the mixture coefficients $$\omega'^{k,c}_{j,m}$$

for mixture m of state j channel c and super state k. The updated Gaussian parameters may be obtained according to the following formulations:

$$\mu'^{k,c}_{j,m} = \frac{\sum_r \sum_{t_0} \sum_{t_1} \psi_{t_0,t_1}^{(r)}(k, c, j, m) O_{t_0,t_1,c}^{(r)}}{\sum_r \sum_{t_0} \sum_{t_1} \psi_{t_0,t_1}^{(r)}(k, c, j, m)}$$

$$U'^{k,c}_{j,m} = \frac{\sum_r \sum_{t_0} \sum_{t_1} \psi_{t_0,t_1}^{(r)}(k, c, j, m)(O_{t_0,s,t_1,c}^{r} - \mu'^{k,c}_{j,m})(O_{t_0,t_1,c}^{(r)} - \mu'^{k,c}_{j,m})^T}{\sum_r \sum_{t_0} \sum_{t_1} \psi_{t_0,t_1}^{(r)}(k, c, j, m)}$$

$$\omega'^{k,c}_{j,m} = \frac{\sum_r \sum_{t_0} \sum_{t_1} \psi_{t_0,t_1}^{(r)}(k, c, j, m)}{\sum_r \sum_{t_0} \sum_{tl} \sum_{m=1}^{M} \psi_{t_0,t_1}^{(r)}(k, c, j, m)}$$

where $\psi_{t_0,t_1}^{(r)}(k, c, j, m)$ may equal to one if the observation $O_{t_0,t_1,c}^{(r)}$ is assigned to super state k, state j in channel c and mixture component m, and zero otherwise.

The update of parameters based on a training sample may be carried out iteratively This may be necessary because the Viterbi algorithm may yield different optimal segmentation during each iteration before convergence. Between two consecutive iterations, if the difference of observation likelihood computed with the Viterbi algorithm is smaller than a specified threshold, the iteration may be terminated. The HMM-CHMM corresponds to a complexity of quadratic with respect to the number of states in the model. In addition, HMM-CHMM may be efficiently implemented in a parallel fashion.

Figure 4:
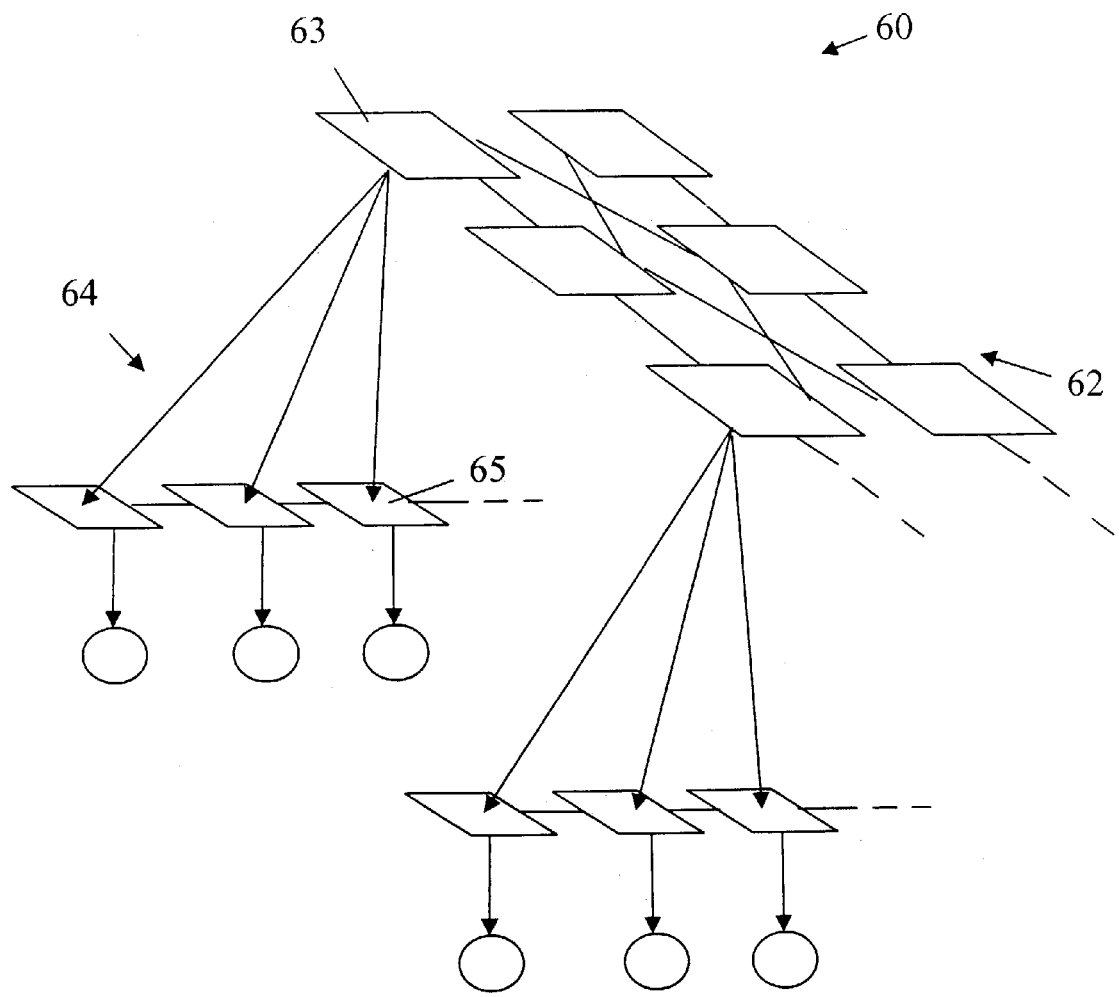
FIG. 4 generically illustrates an embedded coupled hidden Markov model-hidden Markov model (CHMM-HMM) structure.

An alternative logical structure that includes an embedded CHMM-HMM (in contrast to an HMM-CHMM) is generically illustrated by FIG. 4. As seen in that Figure, a logical structure 60 of an embedded hidden Markov model-coupled hidden Markov model. As seen in FIG. 4, the CHMM-HMM is a hierarchical statistical model that includes a CHMM parent layer 62 (collectively formed from nodes 63) and a HMM child layer 64 (collectively formed from nodes 65).

The child layer 64 associates one HMM node 65 to each node 63 in the parent layer 62, and the parameters of the individual HMMs remain independent from each other. Instead, the parameters of each child layer HMM depend upon the state of the connected parent node 63. Typically, for multidimensional data sets, the CHMM in the parent layer 62 is associated with at least one dimension, and the HMM child layers are associated with data in an orthogonal dimension with respect to the parent layer.

Formally defined, the elements of an embedded CHMM-HMM have: an initial super state probability $\pi_{0,0}^s$ in super channel s and a super state transition probability from super state sequence j to super state i in super channel s, $\alpha_{0,i|j}^s$ where super state refers to the state of the parent layer 32 CHMM node 33.

For each super state k the the super channel s the parameters of the corresponding HMM are defined so that the initial state probability is $$\pi_{1,0}^{s,k}$$

the state transition probability from state j to state i is $$a_{1,ij}^{s,k,c}$$

and the observation probability is:

$$b_{t_0,t_1}^{s,k}(j).$$

In a continuous mixture with Gaussian components, the probability of the observation vector O is given by:

$$b^{s,k}(j) = \sum_{m=1}^{M_j^{S,C}} \omega_{j,m}^{s,k} N(O, \mu_{j,m}^{s,k}, U_{j,m}^{s,k})$$

where $\mu_{j,m}^{s,k}$ and $U_{j,m}^{s,k}$ are the mean and covariance matrix of the mth mixture of the Gaussian mixture corresponding to the jth state and mth mixture, $$M_j^{s,k}$$

is the number of mixtures corresponding to the jth state and, $$\omega_{j,m}^{s,k}$$

is a weight associated with the corresponding mixture.

Observation sequences are used to form observation vectors later used in training and classifying. For example, the observation sequence for a two-dimensional image may be formed from image blocks of size $L_x \times L_y$ that are extracted by scanning the image from left-to-right and top-to-bottom. Adjacent image blocks may be designed to have an overlap by $P_y$ rows in the vertical direction and $P_x$ columns in the horizontal direction. In one possible embodiment, with blocks size of $L_y=8$ rows and $L_x=8$ columns, a six DCT coefficients (a 3×2 low-frequency array) may be employed to create the overlap.

The resulting array of observation vectors may correspond to size of $T_0 \times T_1$, where $T_0$ and $T_1$ are the number of observation vectors extracted along the height (H) and the width (W) of the image, respectively.

Consecutive horizontal and vertical observation vectors may also be grouped together to form observation blocks. This maybe used as a way to consolidate local observations and at the same time to reduce the total amount of observations. In practice, this data grouping serves application needs and improve recognition efficiency.

To compute the number of observation blocks, denote the number of observation blocks in the vertical and horizontal direction be $T_0^0$ and $T_1^0$, respectively. Then, $$T_0^0 = C_0$$

$$T_1^0 = T_1$$

In addition, denote the number of observation vectors in the horizontal and vertical direction within each observation block by $T_0^1$ and $T_1^1$, respectively, where $$T_0^1 = \frac{T_1}{C_0}$$

$$T_1^1 = 1$$

Furthermore, denote $O_{t_0,s,t_1}$ as the $t_1$th observation vector corresponding to the observation block $(t_0,s)$.

Although any suitable state sequence segmentation can be used, a modified Viterbi algorithm for the HMM-CHMM is preferred. Application of this modified Viterbi algorithm determines the optimal state and super state segmentation of the observation sequence. The best super state probability for the observation block $(t_0,s)$ given super state $i_s$ of super channel s, is denoted as $P_{t_0,s}(i_s)$. Corresponding optimal state and optimal state sequence $\beta_{t_0,t_1,s}(i_s)$ may then be computed for each super observation. The following states are first initiazed:

$$\delta_{0,0}(i) = \prod_s \pi_{0,0}^s(i_s) P_{t_0,s}(i_s)$$

$$\psi_{0,0}(i) = 0$$

The following states are then recursively determined:

$$\delta_{0,t_0}(i) = \max_j \{\delta_{0,t_0-1}(j) \prod_s a_{0,i_s|j_s-1,j_s,j_s+1}^s P_{t_0,s}(i_s)\}$$

$$\psi_{0,t_0}(i) = \arg\max_j \{\delta_{0,t_0-1}(j) \prod_s a_{0,i_s|j_s-1,j_s,j_s+1}^s P_{t_0,s}(i_s)\}$$

The termination condition is then computed:

$$P = \max_i \{\delta_{T_0}(i)\}$$

$$\{\alpha_{T_0,1}, \ldots, \alpha_{T_0,S}\} = \arg\max_i \{\delta_{T_0}(i)\}$$

Based on the computed termination condition, a backtracking operation is performed:

$$\{\alpha_{T_0,1}, \ldots, \alpha_{T_0,S}\} = \psi_{0,t+1}(\alpha_{T_0+1,1}, \ldots, \alpha_{T_0+1,S})$$

$$q_{t_0,s,t_1}^0 = \alpha_{t_0,s}$$

$$q_{t_0,s,t_1}^1 = \beta_{t_0,s,t_1}(\alpha_{t_0,s})$$

Training of an embedded CHMM-HMM based on the Viterbi algorithm is substantially similar to that illustrated with respect to training of a HMM-CHMM as seen in FIG. 3. To train an CHMM-HMM based on given training data, observation vectors are first extracted from the training data set and organized in observation blocks. These observation blocks are segmented uniformly and at consecutive iterations through an optimal state segmentation algorithm, have their model parameters estimated and observation likelihood determined. As will be appreciated, the training may be iterative, with each training data set used individually and iteratively to update model parameters until the observation likelihood computed is smaller than a specified threshold.

More specifically, the training data set maybe segmented along a first dimension into S super channels. Then within each of such super channels, training data may further be uniformly segmented, according to the number of super states in each super channel, into a plurality of uniform segments each of which corresponding to a super state. Based on the uniform segmentation at the super layer, the observation vectors within each uniform segment may then be uniformly segmented according to the number of states of each child HMM. The density function of each state (including both super states as well as child states) may be initialized before the training takes place. For example, if Gaussian mixture model is adopted for each state, Gaussian parameters for each of the mixture component may need to be initialized. Different approaches may be employed to achieve the initialization of model parameters. For example, one embodiment may be implemented where the observation sequence assigned to state j, super state k and super channel s may be assigned to $M_j^{s,k}$ clusters using, for example, the K-means algorithm.

During the process of training, the original uniform segmentation is updated based on the optimal state segmentation using the Viterbi algorithm or other suitable algorithms. To update the density function of a state, particular relevant parameters to be updated may be determined prior to the update operation. Depending on the density function used for each state, the selection may be carried out accordingly.

The selection of a Gaussian mixture components for each state j and super state k and super channel s is also required. One exemplary criterion to make the selection may correspond to assigning the observation $O_{t_0,s,t_1}^{(r)}$ from the rth training sample in the training set to the Gaussian component for which the Gaussian density function $$N(O_{t_0,s,t_1}^{(r)}; \mu_{j,m}^{s,k}, U_{j,m}^{s,k})$$

is the highest.

The parameters are then estimated using, for example, an extension of the segmental K-means algorithm. In particular, the estimated transition probability $a'_{0,i_s|j}^{s}$ between super states $i_s$ and the super state sequence j may be obtained as follows:

$$a'^{s}_{0,i_s|j} = \frac{\sum_r \sum_{t_0} \sum_{t_1} \in_{t_0}^{(r)} (s, i_s, j)}{\sum_r \sum_{t_0} \sum_{t_1} \sum_l \in_{t_0}^{(r)} (s, i_s, l)}$$

where $\in_{t_0}^{(r)}(s, i_s, l)$ may equal to one if a transition from state sequence l to the super state $i_s$ in super channel s occurs for the observation block $(t_0, s)$ and zero otherwise. The estimated transition probabilities between embedded states $a^{i,j|s,k}$ may then be obtained as follows, $$a'^{s,k}_{1,i|j} = \frac{\sum_r \sum_{t_0} \sum_{t_1} \theta_{t_0,t_1}^{(r)}(s, k, i, l)}{\sum_r \sum_{t_0} \sum_{t_1} \sum_l \theta_{t_0,t_1}^{(r)}(s, k, i, l)}$$

where $\theta_{t_0,t_1}^{(r)}(s, k, i, l)$ may be one if in the observation block $(t_0, s)$ a transition from state j to state is $i_s$ channel c occurs for the observation $O_{t_0,s,t_1}^{(r)}$ and zero otherwise. The parameters of the selected Gaussian mixture component may also be accordingly updated. The involved Gaussian parameters may include a mean vector $\mu'_{j,m}^{s,k}$, a covariance matrix $U'^{j,m,s,k}$ of the Gaussian mixture, and the mixture coefficients $\omega'_{j,m}^{s,k}$ for mixture m of state j in super state k and super channel s. The updated Gaussian parameters may be obtained according to the following formulations:

$$\mu'^{s,k}_{j,m} = \frac{\sum_r \sum_{t_0} \sum_{t_1} \psi_{t_0,t_1}^{(r)}(s, k, j, m) \times O_{t_0,s,t_1}^{(r)}}{\sum_r \sum_{t_0} \sum_{t_1} \psi_{t_0,t_1}^{(r)}(s, k, j, m)}$$

$$U'^{s,k}_{j,m} = \frac{\sum_r \sum_{t_0} \sum_{t_1} \psi_{t_0,t_1}^{(r)}(s, k, j, m) \times (O_{t_0,s,t_1}^{r} - \mu'^{s,k}_{j,m}) \times (O_{t_0,s,t_1}^{(r)} - \mu'^{s,k}_{j,m})^T}{\sum_r \sum_{t_0} \sum_{t_1} \psi_{t_0,t_1}^{(r)}(s, k, j, m)}$$

$$\omega'^{s,k}_{j,m} = \frac{\sum_r \sum_{t_0} \sum_{t_1} \psi_{t_0,t_1}^{(r)}(s, k, j, m)}{\sum_r \sum_{t_0} \sum_{tl} \sum_{m=1}^{M} \psi_{t_0,t_1}^{(r)}(s, k, j, m)}$$

where $\psi_{t_0,t_1}^{(r)}(s, k, j, m)$ may equal to one if the observation $O_{t_0,s,t_1}^{(r)}$ is assigned to super state k in super channel s, state j and mixture component m, and zero otherwise.

The update of parameters based on a training sample maybe carried out iteratively. This may be necessary because the Viterbi algorithm may yield different optimal segmentation during each iteration before convergence. Between two consecutive iterations, if the difference of observation likelihood computed with the Viterbi algorithm is smaller than a specified threshold, the iteration may be terminated. The CHMM-HMM corresponds to a complexity of quadratic with respect to the number of states in the model. In addition, CHMM-HMM may be efficiently implemented in a parallel fashion.

As will be understood, reference in this specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims, including any amendments thereto, that define the scope of the invention.

The invention claimed is:

1. A pattern recognition method, comprising:
    forming a hierarchical statistical model using a hidden Markov model (HMM) and a coupled hidden Markov model (CHMM), the hierarchical statistical model supporting a parent layer having multiple supernodes and a child layer having multiple nodes associated with each supernode of the parent layer; wherein either the parent layer is formed of an HMM and the child layer is formed of a CHMM, or the parent layer is formed of a CHMM and the child layer is formed of an HMM; the hierarchical statistical model applied to two dimensional data, with the parent layer describing data in a first direction and the child layer describing data in a second direction orthogonal to the first direction;
    training the hierarchical statistical model using observation vectors extracted from a data set;
    obtaining an observation vector sequence from a pattern to be recognized; and
    identifying the pattern by finding a substantially optimal state sequence segmentation for the hierarchical statistical model.

2. The method according to claim 1, wherein the hierarchical statistical model defines an initial super state probability in a super channel.

3. The method according to claim 1, wherein the hierarchical statistical model defines super state transition probability from a sequence of states in the super channel.

4. The method according to claim 1, wherein the hierarchical statistical model defines observation likelihood given a state of a channel.

5. The method according to claim 1, wherein identifying the object comprises using a Viterbi algorithm to determine a substantially optimal state sequence for the hierarchical statistical model based on the observation vector sequence.

6. The method according to claim 1, wherein the data set includes two-dimensional data.

7. An article comprising a computer readable storage medium having stored thereon instructions that when executed by a machine result in:
    forming a hierarchical statistical model using a hidden Markov model (HMM) and a coupled hidden Markov model (CHMM), the hierarchical statistical model supporting a parent layer having multiple supernodes and a child layer having multiple nodes associated with each supernode of the parent layer; wherein either the parent layer is formed of an HMM and the child layer is formed of a CHMM, or the parent layer is formed of a CHMM and the child layer is formed of an HMM; the hierarchical statistical model applied to two dimensional data, with the parent layer describing data in a first direction and the child layer describing data in a second direction orthogonal to the first direction;
    training the hierarchical statistical model using observation vectors extracted from a data set;
    obtaining an observation vector sequence from a pattern to be recognized; and
    identifying the pattern by finding a substantially optimal state sequence segmentation for the hierarchical statistical model.

8. The article of claim 7, wherein the hierarchical statistical model defines an initial super state probability in a super channel.

9. The article of claim 7, wherein the hierarchical statistical model defines super state transition probability from a sequence of states in the super channel.

10. The article of claim 7, wherein the hierarchical statistical model defines observation likelihood given a state of a channel.

11. The article of claim 7, wherein identifying the object comprises using a Viterbi algorithm to determine a substantially optimal state sequence for the hierarchical statistical model based on the observation vector sequence.

12. The article of claim 7, wherein the data set includes two-dimensional data.

13. A system comprising:
    a hierarchical statistical model to use both hidden Markov models and coupled hidden Markov models to model patterns, the hierarchical statistical model supporting a parent layer having multiple supernodes and a child layer having multiple nodes associated with each supernode of the parent layer; wherein either the parent layer is formed of a hidden Markov model (HMM) and the child layer is formed of a coupled HMM (CHMM), or the parent layer is formed of a CHMM and the child layer is formed of an HMM; the hierarchical statistical model applied to two dimensional data, with the parent layer describing data in a first direction and the child layer describing data in a second direction orthogonal to the first direction;
    a training module to train for the hierarchical statistical model using observation vectors extracted from a data set; and
    an identification module to obtain an observation vector sequence for a pattern to be recognized, and to identify the pattern by finding a substantially optimal state sequence segmentation for the hierarchical statistical model.

14. The system according to claim 13, wherein the hierarchical statistical model defines an initial super state probability in a super channel.

15. The system according to claim 13, wherein the hierarchical statistical model defines super state transition probability from a sequence of states in the super channel.

16. The system according to claim 13, wherein the hierarchical statistical model defines observation likelihood given a state of a channel.

17. The system according to claim 13, wherein the identification module is adapted to use a Viterbi algorithm to determine a substantially optimal state sequence for the hierarchical statistical model based on the observation vector sequence.

18. The system according to claim 13, wherein the data set includes two-dimensional data.

* * * * *